US011182292B1

(12) United States Patent
Allan

(10) Patent No.: US 11,182,292 B1
(45) Date of Patent: Nov. 23, 2021

(54) MULTI-BANK CACHE

(71) Applicant: Advanced Micro Devices, Inc., Santa Clara, CA (US)

(72) Inventor: Jeffrey Christopher Allan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/028,825

(22) Filed: Sep. 22, 2020

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
CPC .................................................. G06F 12/0802
USPC .......................................................... 711/118
See application file for complete search history.

(56) References Cited

U.S. PATENT DOCUMENTS

| 2003/0145036 A1* | 7/2003 | Hartmann | ............ | G06K 7/0008 709/201 |
| 2005/0198062 A1* | 9/2005 | Shapiro | ............... | G06F 16/2282 |

* cited by examiner

*Primary Examiner* — Jae U Yu
(74) *Attorney, Agent, or Firm* — Volpe Koenig

(57) ABSTRACT

Techniques are disclosed for processing cache operations. The techniques include determining a set of cache lines that include data for a vector memory access request; determining bank allocation priorities for the set of cache lines, wherein the bank allocation priorities are chosen to result in the set of cache lines being evenly distributed among the banks; determining actual banks for the set of cache lines; and accessing the cache lines in one or more access iterations, wherein at least one of the one or more access iterations includes accessing multiple cache lines in different banks at the same time.

20 Claims, 6 Drawing Sheets

BANK OUTPUT 307

US 11,182,292 B1

MULTI-BANK CACHE

BACKGROUND

In many computer systems, caches improve memory access time by storing data considered likely to be used in the future. Improvements to caches are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques are disclosed for processing cache operations. The techniques include determining a set of cache lines that include data for a vector memory access request; determining bank allocation priorities for the set of cache lines, wherein the bank allocation priorities are chosen to result in the set of cache lines being evenly distributed among the banks; determining actual banks for the set of cache lines; and accessing the cache lines in one or more access iterations, wherein at least one of the one or more access iterations includes accessing multiple cache lines in different banks at the same time.

Figure 1:
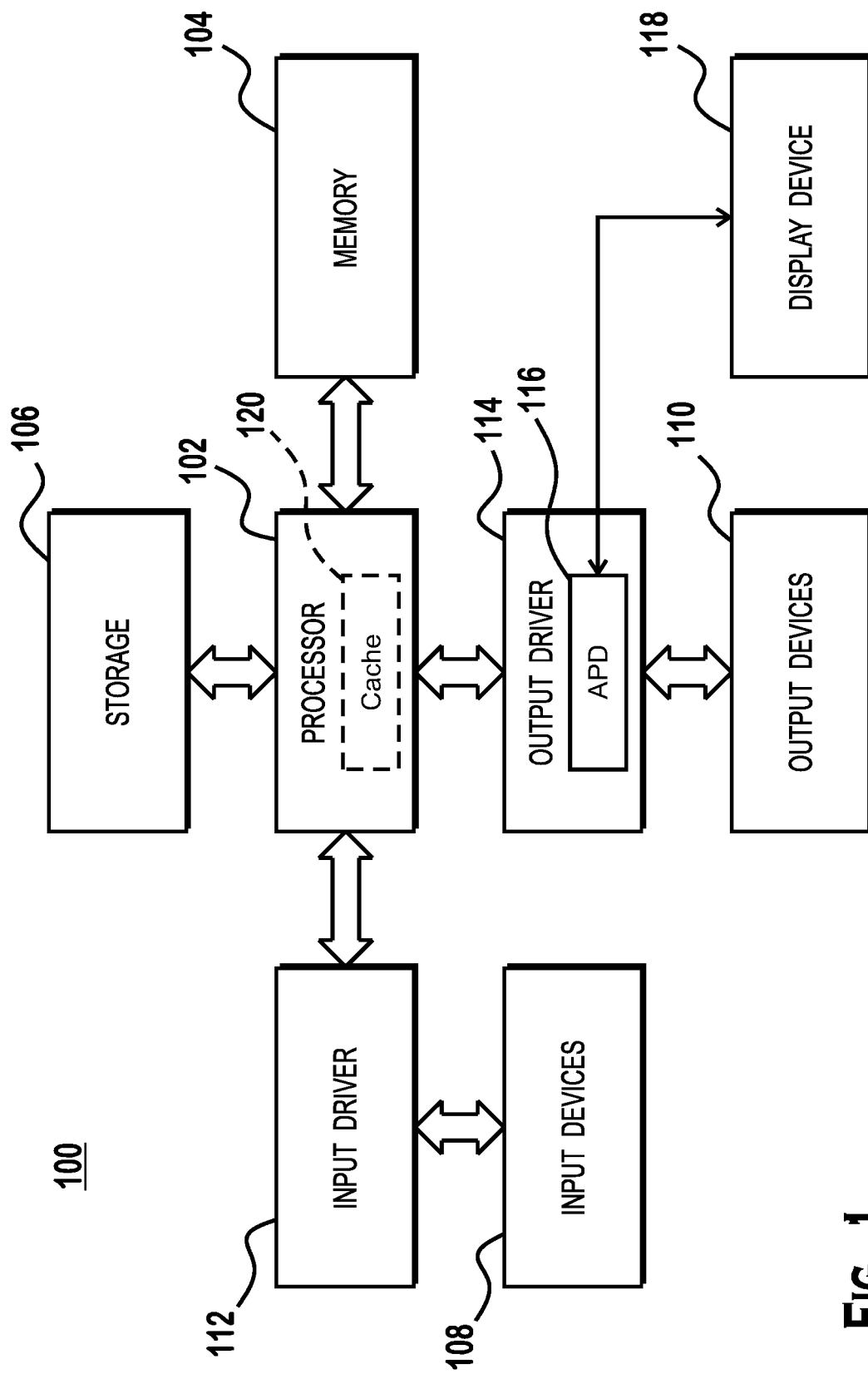
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache. In some implementations, the processor 102 includes one or more caches 120. As is generally known, a cache stores data items judged by a cache manager as likely to be accessed by instructions executing on the processor 102 in the near future. The cache 120 represents one or more cache memories of the processor 102. In various implementations, the one or more cache memories are organized into a cache hierarchy, where caches higher in the cache hierarchy service misses from and receive evited cache entries from caches lower in the cache hierarchy.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
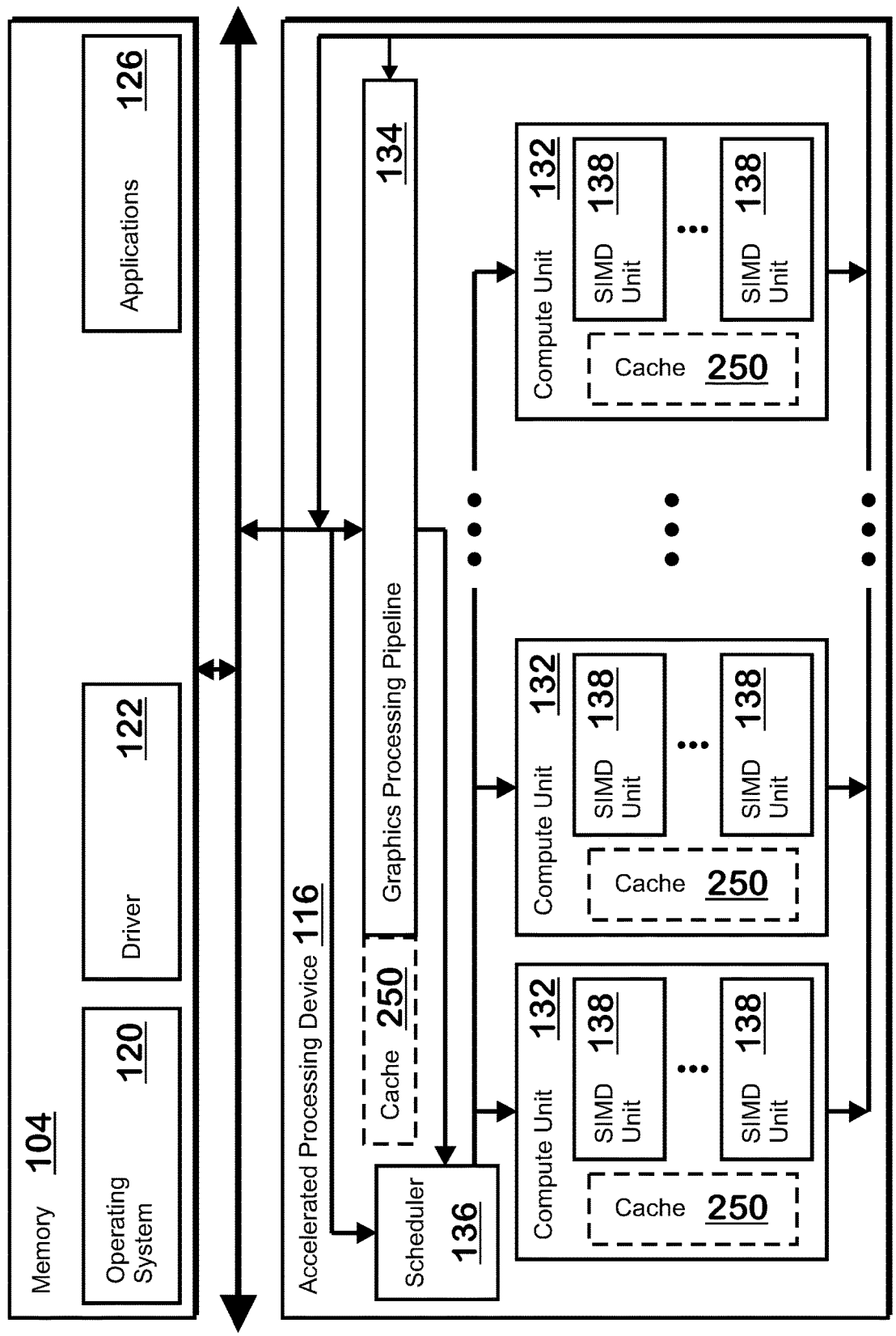
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. In some examples, these compute processing operations are performed by executing compute shaders on the SIMD units 138.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD command processor 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

In various implementations, the APD 116 includes one or more cache memories 250. Some example locations for the cache memories 250 include within the compute units 132 and outside of the compute units 132 but within the APD 116. In various examples, the different illustrated cache memory 250 locations represent different types of cache memories, such as cache memories at different levels of a cache hierarchy. The cache memories 250 operate in a similar manner as with respect to the cache memories 120 of FIG. 1.

The graphics processing pipeline 134 includes hardware that performs graphics rendering, in some implementations using the compute units 132 to perform tasks such as executing shader programs. In general, the graphics rendering operations include converting geometry specified in a three-dimensional word space into pixels of a screen space for display or other use. In various examples, the graphics processing pipeline 132 performs the operations of one or more of a vertex shader stage, which executes vertex shader programs on the compute units 132, a hull shader stage, which executes hull shader programs on the compute units 132, a domain shader stage, which executes domain shader programs on the compute units 132, a geometry shader stage, which executes geometry shader programs on the compute units 132, and a pixel shader stage, which executes pixel shader programs on the compute units 132. The APD 116 is also capable of performing compute shader programs, which are not included in the typical functionality of the graphics processing pipeline 134, on the compute units 132. The cache memories 250 perform caching operations for the shader programs executing on the compute units 132.

Figure 3:
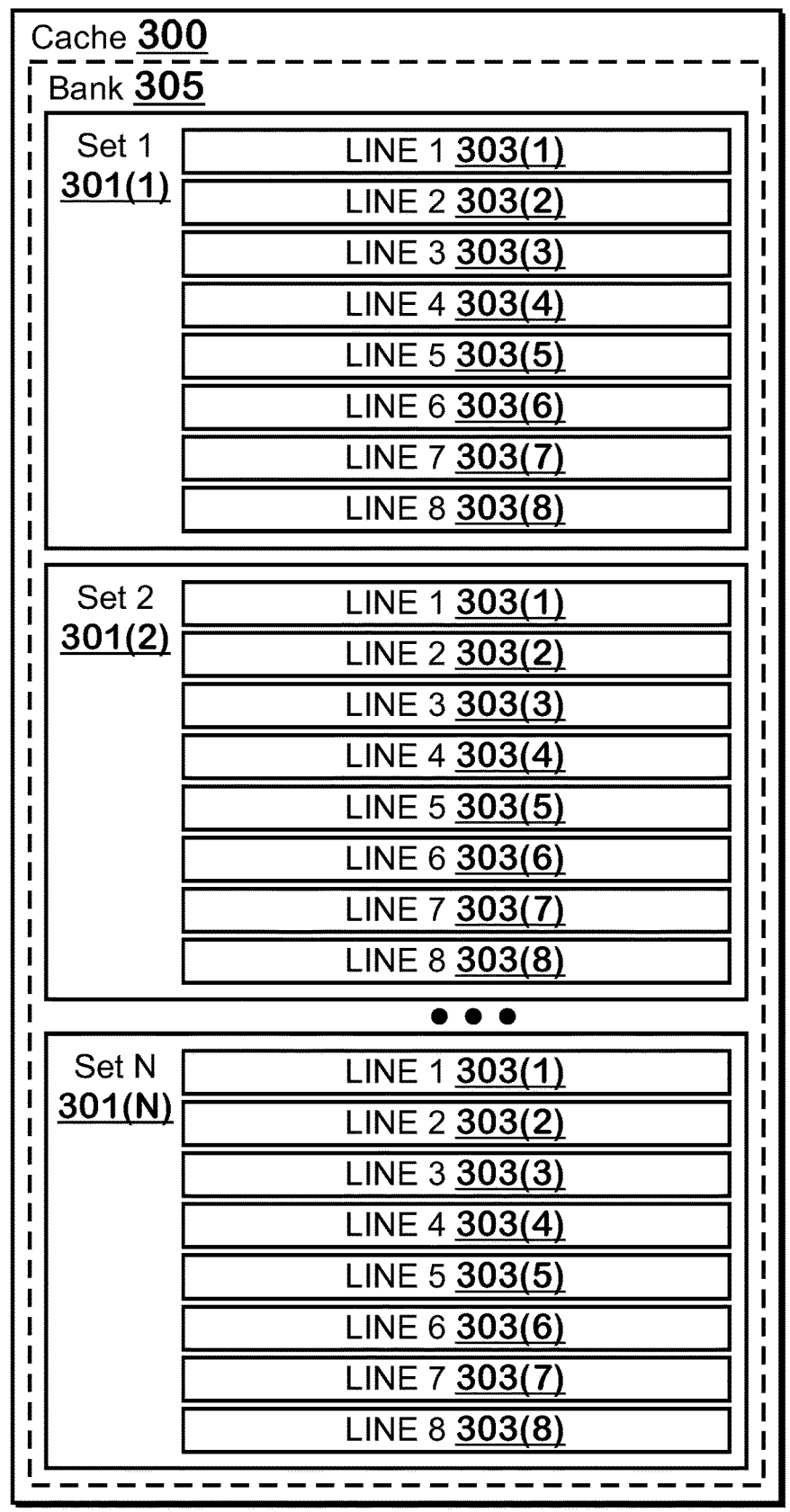
FIG. 3 illustrates an example single-bank cache.

FIG. 3 illustrates an example single-bank cache 300. The single bank cache 300 includes one bank 305, including a number of sets 301. Each set 301 includes a number of cache lines 303. In the example, there are eight cache lines 303 per set 301. Herein, a "bank 305" is a portion of cache memory that, in one cycle, has sufficient circuitry (e.g., input and output ports) to provide a single cache line 303, and no more than one cache line 303, in response to a request to read data from the bank 305. It should be noted that the example cache memory 300 is 8-way set associative, as there are eight cache entries (lines 303) in each set 301.

In operation, an entity, such as a SIMD unit 138, executes memory operations to access memory at a given address. The cache memory 300 services such a request by identifying which set 301 is associated with the address and then attempting to match a tag (not shown) of each cache line 303 in the identified set to a tag associated with the address. In the situation that a tag match occurs, the cache line 303 associated with the tag is read out by the cache memory 300 to the requestor.

Due to the limitations of the hardware, such as the fact that there is only a single bank 305 having only one output port 307, the cache memory 300 is capable of reading out only a single cache line 303 per cycle. This limitation sometimes acts as a certain type of bottleneck, such as for SIMD operations performed in the SIMD units 138. More specifically, in SIMD operations, instructions execute in a single cycle for multiple SIMD lanes. If different lanes executing the same memory access instruction in a given cycle access different cache lines 303, then that instruction would trigger accesses to multiple cache lines. However, only one cache line for one of these multiple lanes could be retrieved from a cache 300 in a given cycle, thereby limiting the performance of the SIMD memory access request.

Figure 4:
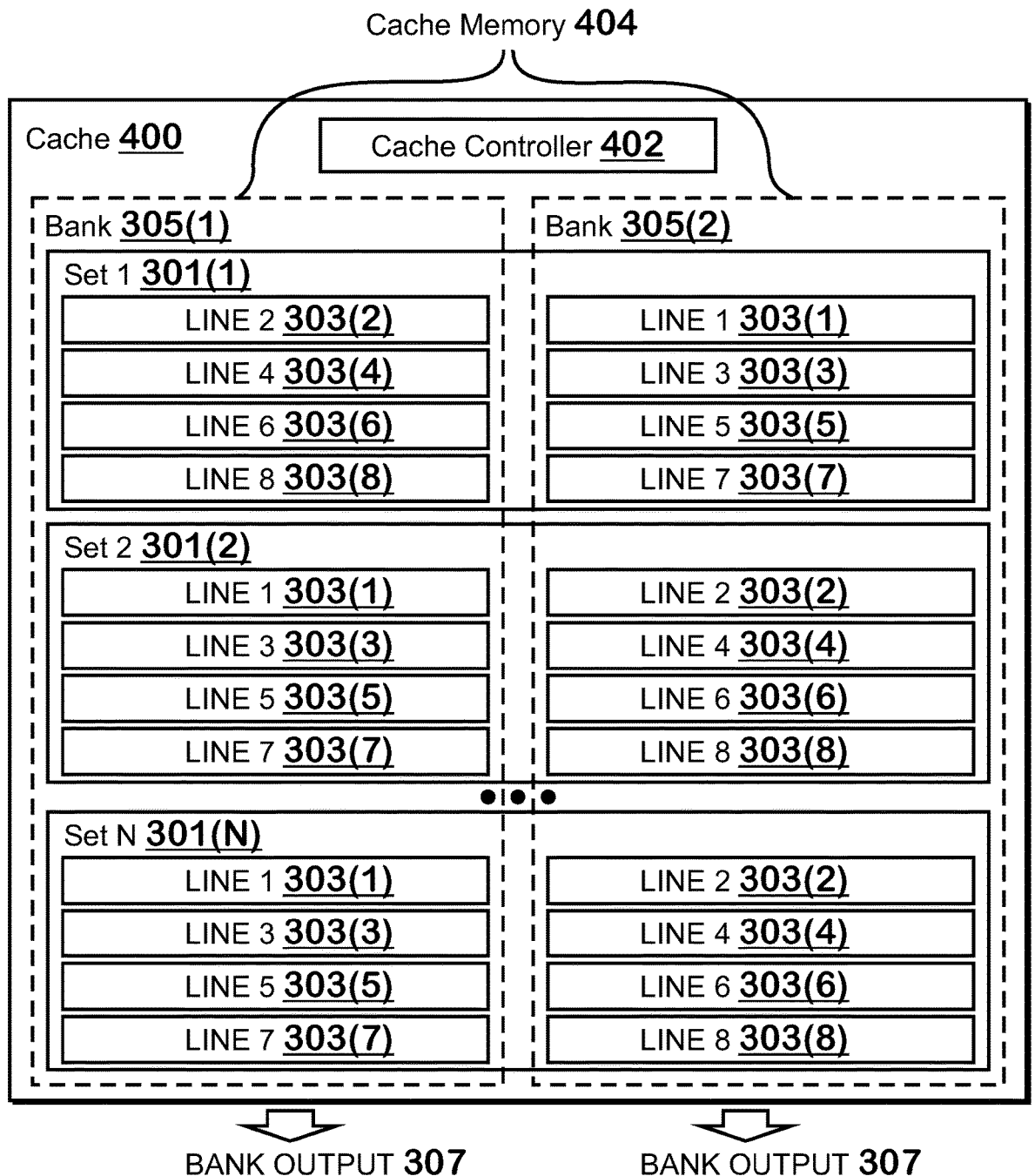
FIG. 4 is a flow diagram illustrating a multi-bank cache memory, according to an example.

FIG. 4 is a block diagram illustrating a multi-bank cache memory 400, according to an example. In the multi-bank cache memory 400, multiple banks 305 are included. In the example of FIG. 4, there are two banks 305 in the cache memory 400, but those of skill in the art will understand that a cache memory 400 having any number of banks 305 greater than one falls within the scope of the present disclosure. Each set 301 spans more than one bank 305, such that each set 301 includes at least one cache line 303 in one bank 305 and at least one cache line 303 in another bank 305. Each bank 305 also spans multiple sets 301 as shown. The banks 305, and cache line slots 303 for all sets therein, are together called a "cache memory 404" herein.

Each bank 305 has a bank output 307 that is able to output a single cache line 303 in one cycle. Thus, as compared with the cache memory 300 of FIG. 3, the cache memory 400 of FIG. 4 is able to output more cache lines 303 in a single cycle. More specifically, if, in a single cycle, an entity (such as a SIMD unit 138) requests access to two cache lines 303, where each different cache line 303 is in a different bank 305, then the cache memory 400 is able to output each such cache line 303 in a single cycle. However, in order to take advantage of this additional capacity, the multiple cache lines being requested must actually be in different banks 305 of the cache memory 400. If the requested cache lines are in the same bank 305, then due to the fact that each bank 305 is limited in terms of the amount of data that can be output in a given cycle, the multiple cache lines could not be output in a single cycle. For this reason, the cache controller 402 implements a cache line allocation technique that causes cache lines likely to be read out together to be placed into different banks 305. Additional details are now provided.

Figure 5:
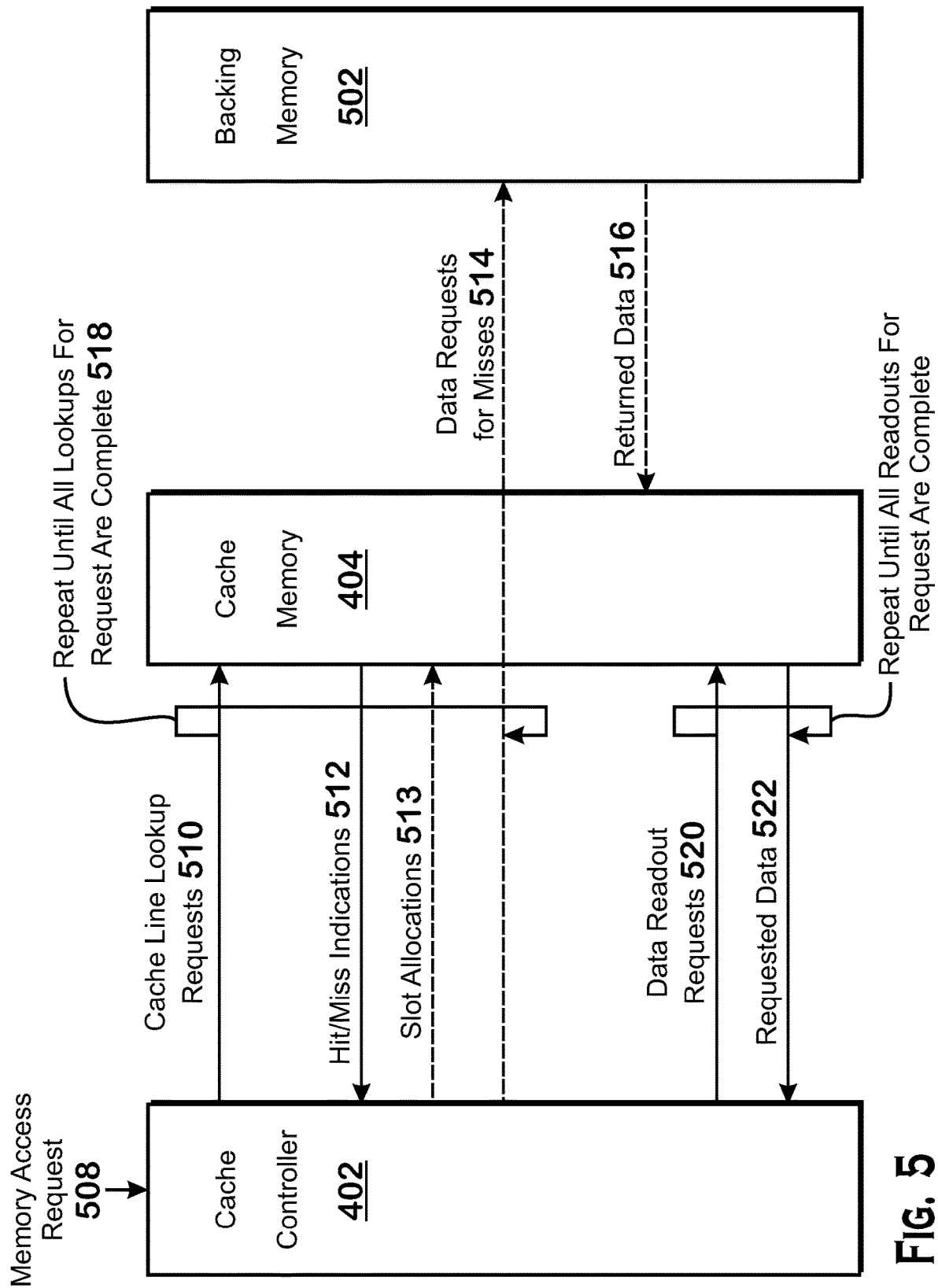
FIG. 5 illustrates the overall data flow for cache operations in response to a memory access request received from a processing unit such as a SIMD unit, according to an example.

FIG. 5 illustrates the overall data flow for cache operations in response to a memory access request 508 received from a processing unit such as a SIMD unit 138, according to an example. In some examples, a memory access request 508 is a vector memory request generated by an instruction executing in a SIMD manner. More specifically, a SIMD instruction executes as an identical instruction with different data for different work-items. Because each work-item can specify a different memory address to access, the execution of a memory access instruction results in a "vector" of addresses to access, including all memory addresses requested to be accessed by all work-items executing the instruction. A request to access the addresses specified by the vector is a memory access request 508.

The cache controller 402 receives a memory access request 508 from a requestor (e.g., a SIMD unit 138) and processes the memory access request 508 for the requestor. The cache controller 402 determines which cache lines are involved in the request. More specifically, as stated, the request 508 includes indications of multiple memory addresses. It is possible for these multiple memory addresses to fall within one or more different cache lines.

To service the memory access request 508, the cache controller 402 performs lookups (510) to determine the residency for each cache line involved in the request within the cache memory 404. The cache controller 402 receives information regarding hits and misses from the cache memory 404 (512). For misses that occur, the cache controller 402 allocates (513) a cache line entry 303 in the cache memory 404 and also fetches (514) the missing line from a backing memory 502—which represents the rest of the cache hierarchy, including a different cache memory, other memory, or other source. In response to the data being returned 516 from the backing memory, the cache controller 402 stores that data into the allocated cache line entry 303. In response to all cache lines for the memory access request 508 being stored in the cache memory 404, the cache controller 402 transmits data readout requests 520 to the cache memory 404, which returns the requested data 522. The cache controller 402 provides this requested data back to the requestor.

Note that, in some circumstances, the cache line lookup requests 510, the hit/miss indications 512, allocation 513, and the data requests for misses 514 occur multiple times for a single memory access request 508. The number of times that these acts are repeated is based on the number of cache lines involved in the request 508 and the number of cache lines for which lookups 510 can be performed in a single iteration. For example, if lookups for only two cache lines can be performed in a single iteration (e.g., because the hardware of the cache memory 404 is limited such that a maximum of two lookups can be performed at the same time), then the steps above are repeated twice for a request 508 that involves 4 different cache lines.

Note that the data readout requests 520 and requested data 522 are also repeated until the cache lines for the entire memory access request 508 are read out. More specifically, once all the cache lines for the misses of the request 508 are stored in the cache memory 404, the cache controller 402 provides these cache lines to the requestor. However, there is a limit to how many cache lines can be read out of the cache memory 404 at a time. For example, as illustrated in FIG. 4, the existence of two banks 305 in a cache memory 404 means that in such an example of a cache memory 404, a maximum of two cache lines can be read out of the cache memory 404 at a time (e.g., in a given cycle). Thus if the request 508 is associated with more than this limit, the cache controller 402 reads out the cache lines for the request 508 over multiple cycles.

As described above, cache lines in different banks 305 can be read out together (e.g., in the same clock cycle), but cache lines in the same bank 305 cannot be read out in the same clock cycle. Therefore, in allocating 513 cache line entries 303 for miss data, the cache controller 402 attempts to "spread out" the allocations across the banks 305. More specifically, the cache controller 402 attempts to equalize the number of allocations that occur in all different banks 305 so that, when read out occurs, as many cache lines as possible can be read out together.

In addition, as described above, once all cache lines for a request 508 are in the cache memory 404, the cache controller 402 reads out the cache lines from the cache memory 404 a number of iterations necessary to read out all data for the request 508. In each iteration, to the degree possible, the cache controller 402 selects cache lines for readout that are in different banks 305. Selecting cache lines in different banks 305 for readout in a single cycle provides an increased bandwidth, since cache lines from the same bank 305 cannot be read together in the same cycle.

As described above, each request for a missed cache line 514 results in an allocation 513. In addition, the cache controller 402 performs allocations 513 for all of the cache lines involved in a single cache line lookup request iteration 510. Several techniques for performing allocations are now provided. In general, in each of these techniques, the cache controller 402 determines a bank 305 "priority" for each allocation 513 involved in a particular lookup request 510. The cache controller attempts to allocate 513 an entry in to the bank determined as priority, but is not always able to do so. In one example, no slots 303 in the priority bank 305 are available, while slots in the non-priority bank are available. In general, slots 303 are not available in the instance that the slot 303 has been allocated to a cache line that is currently being fetched from the backing memory 502 and whose data has not yet been read to the requestor.

In a first technique for allocation, referred to as a "fixed" technique, the cache controller selects priority banks 305 for the cache lines involved in the first iteration of cache line lookup requests 510 in a fixed manner. This priority selection is performed based on the address of the cache line. In an example, the cache controller 402 selects the priority bank 305 based on a particular bit of the address, such as a particular bit of the tag. In addition, the bank 305 that is selected differs based on which set 301 the cache line is to be stored in. In an example, if a particular bit value for the selection bit of the address selects bank 1 305(1) for set 1 301(1), then that same bit value selects bank 2 305(2) for set 2 301(2).

As described above, it is possible for the cache controller 402 to choose a bank 305 for an allocation that is different than the priority bank selected. In one example, no slots 303 are available in the priority bank 305. In that instance, the cache controller 402 selects a bank 305 with an available slot 303 as the bank 305 for the allocation. In the instance that no slots 303 are available in any banks 305, the cache controller 402 waits to select a bank for allocation until at least one slot 303 is available.

To choose the priority bank for the second and subsequent allocation iterations for a given request 508, the cache controller 402 alternates the bank 305 selected for each allocation and does not choose a bank 305 for allocation in the manner described above for the first allocation iteration. More specifically, for each new allocation iteration performed by the cache controller 402 for the same request 508, the cache controller 402 selects, as the priority banks 305 for the cache lines involved in that allocation iteration, a combination of banks 305 that are the opposite of the banks 305 selected for actual allocation of the immediately prior allocation iteration. A "combination of banks 305 that are the opposite of the immediately prior allocation" means that if multiple allocations are selected in the immediately prior allocation iteration and the current allocation iteration, then the priority selected for each bank in the current allocation iteration is the opposite of the bank 305 actually selected for the allocation in the same position in the immediately previous iteration. In an example, if the immediately previous allocation iteration selected bank 1 and bank 2, then the current allocation iteration selects bank 2 and bank 1. In another example, if the immediately previous allocation iteration selected bank 1 and bank 1, then the current allocation iteration selects bank 2 and bank 2. In the case that the current allocation iteration includes only one allocation, the cache controller 402 selects, as priority, the alternate bank 305 of the last bank allocated for the immediately prior allocation iteration. In an example, one allocation iteration includes an allocation in bank 1. Due to this, the cache controller 402 selects as the next allocation iteration, an allocation in bank 2. In another example, one allocation iteration includes an allocation to bank 1 and an allocation to bank 2. Due to this, the cache controller 402 selects as the next allocation iteration, an allocation in bank 1. The banks for these subsequent allocation iterations are still considered priority selections, meaning that the cache controller 402 still respects the actual conditions of the cache memory 404, such as whether any entries 303 are available in the priority side, as described for the first allocation iteration.

With a bank 305 actually selected for an allocation, the cache controller 402 selects an entry 303 to allocate based on any technically feasible replacement algorithm such as least recently used.

Another technique for determining a side to allocate an entry 303 from is referred to herein as a "dynamic" technique. According to the dynamic technique, the cache controller 402 selects banks 305 for allocations in a manner that evens out banks 305 selected on an ongoing basis, and also that accounts for the number of available slots for each bank 305. More specifically, in the first allocation iteration, the cache controller 402 selects banks 305 for a first allocation based on the number of available slots 303 in each bank 305. Each allocation in the first allocation iteration is given the bank 305 with the greatest number of available slots. Subsequently (i.e., in subsequent allocation iterations for the same request 508), the cache controller 402 alternates the chosen bank 305 in a manner similar to the fixed technique. An entry 303 is actually allocated within a bank 305 in any technically feasible manner, such as with a least-recently-used replacement algorithm.

In the above description of bank selection, it is stated that bank selection after the first allocation iteration should alternate banks 305 chosen based on the actually allocated bank. It should be understood that the banks chosen for the subsequent allocation iterations are chosen based on which banks are actually allocated or based on the bank of a cache line for which a hit occurred, rather than based on the priority bank. The bank of the cache lines for which hits have occurred should be taken account because, during read outs (520 and 522), the cache controller 402 will read from all cache lines involved in the request, even if a hit occurred for some of those cache lines. Thus the best bandwidth will occur where cache lines from different banks 305 are read out together. In an example, a first lookup request 510 iteration results in a hit and a miss. The hit line is in bank 1 and the miss line is allocated bank 2. A subsequent lookup request results in two misses. To allocate for the second allocation iteration, the first cache line is given, bank 2 as bank priority, where bank 2 is the opposite of the hit line. The second cache line is given, bank 1 as bank priority the opposite of the missed line.

Figure 6:
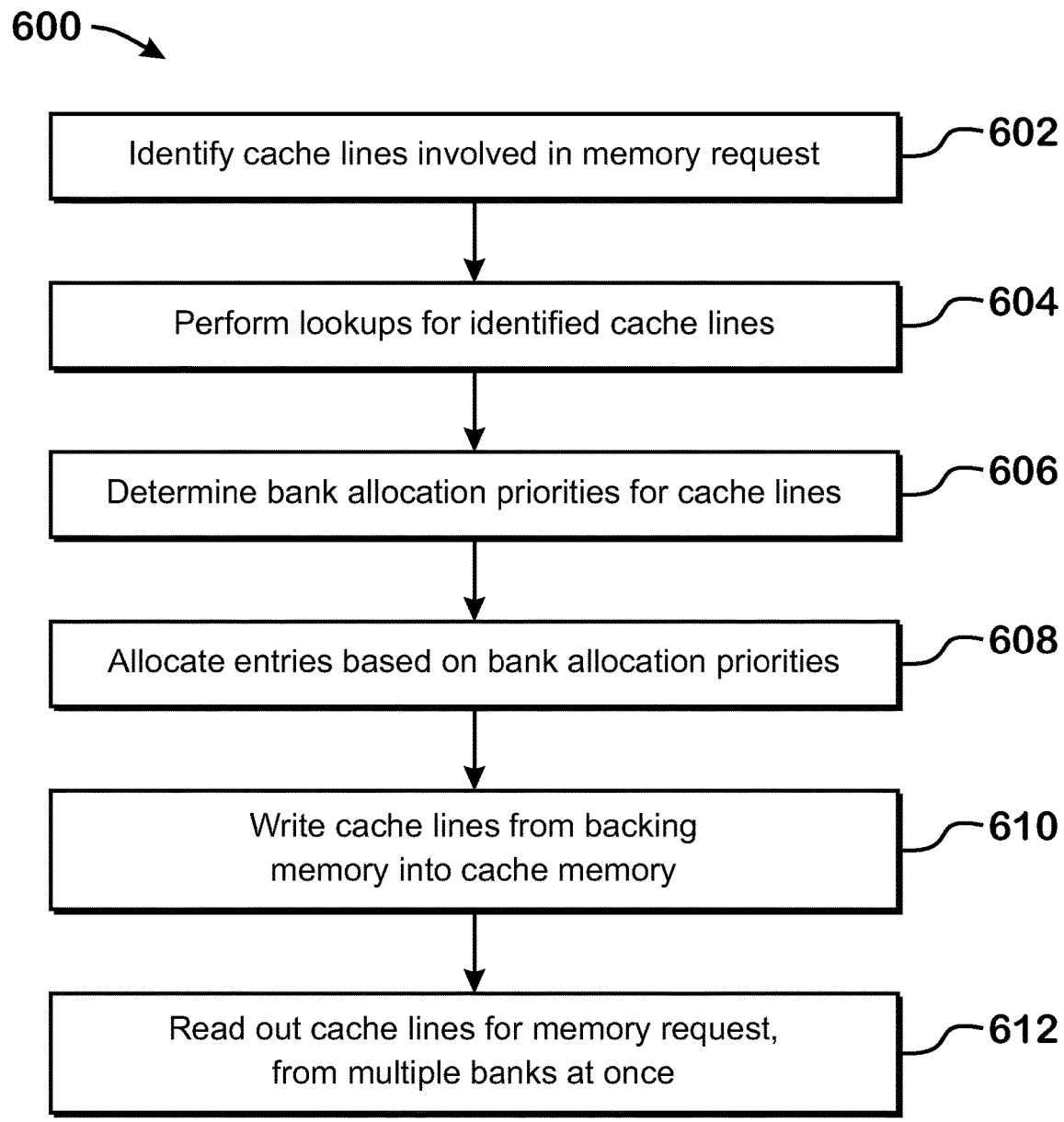
FIG. 6 is a method for performing cache operations, according to an example.

FIG. 6 is a method 600 for performing cache operations, according to an example. Although described with respect to the system of FIGS. 1-5, those of skill in the art will understand that any system, configured to perform the steps of the method 600 in any technically feasible order, falls within the scope of the present disclosure.

The method 600 begins at step 602, where a cache controller 402 receives a request 508 to access memory and identifies cache lines involved in the request 508. As described elsewhere, in some implementations, the request 508 includes individual memory addresses from multiple work-items that execute a memory access instruction together. The cache controller 402 determines which cache lines include the memory addresses involved in such a request 508. More specifically, the cache lines are associated with portions of the memory address space. The cache controller identifies which such portions the requested addresses fall within and thereby determine which cache lines are associated with the request 508.

At step 604, the cache controller 402 performs lookups for the identified cache lines. The lookup requests involve determining whether cache lines are already present within a cache memory 404, in which case the cache line is determined to be a "hit," or whether cache lines are not present within the cache memory 404, in which case the cache line is determined to be a miss. If a cache line is a hit, the cache controller 402 notes at least which bank 305 that cache line is within.

At step 606, for the cache lines that have missed, the cache controller 402 determines bank 305 allocation priorities for the cache lines. In general, the cache controller 402 attempts to prioritize banks 305 in a manner that evens out the banks 305 assigned to all cache lines of a request 508, including the cache lines for which hits occur. More specifically, because readout occurs when all cache lines for a request 508 are in the cache memory 404, and because cache lines in different banks 305 can be read out together (e.g., in the same clock cycle), the cache controller 402 attempts to have all cache lines for the request 508 split as evenly as possible between the available banks 305.

As described elsewhere herein, several example techniques for determining bank priorities 305 for the cache lines of a request 508 are provided. It should be understood that these techniques are used to determine bank priorities 305 for the first allocation iteration performed by the cache controller 402 for a particular request, as bank 305 priorities for subsequent allocation iterations are chosen through a bank alternating technique that alternates which bank 305 is selected with each subsequent iteration, as described below and elsewhere herein.

In a first technique, a "fixed technique," a bank priority is determined for a cache line based on the address of the cache line. Moreover, the bank 305 actually selected for a cache line depends on the set 301 that the cache line is to be stored in. In an example, a particular bit of the address of a cache line determines the side 305 to prioritize for that cache line. One value for that bit (e.g., "0") selects one bank 305 for cache lines that are to be stored in certain sets (e.g., even sets), and selects a different bank 305 for cache lines that are to be stored in different sets (e.g., odd sets). This act of varying the bank that a particular value selects helps to spread out cache lines among banks, since cache lines that are adjacent in the memory address space are assigned to different sets 301.

In another technique, a "dynamic technique," the cache controller 402 identifies a priority for the cache lines based on how many slots 303 are available in each bank 305. A slot 303 is "available" if there are no active memory access requests 508 being performed for that slot 303. More specifically, a memory access request 508 fetches all requested cache lines into the cache memory 404 and then reads out the requested data form those cache lines to the requester. In the course of performing these operations, the cache controller 402 cannot allow cache lines that are already in the cache memory 404 to be overwritten. Thus slots 303 involved in an ongoing request 508 are not available for being replaced by a different request 508.

The cache controller 402 determines a bank priority for a cache line of the first allocation iteration as the bank 305 with the most available slots 303. However, the cache controller 402 also attempts to balance the banks selected for the first allocation iteration among all of the banks 305 to improve read-out bandwidth during read-out. Thus if the first allocation iteration 305 includes multiple cache lines, then the cache controller 402 selects priority banks for each such cache line in a manner such that the banks are assigned to the cache lines in an even manner.

In some implementations, steps 604 and 606 are performed in the order of step 604 first and step 606 second. In other implementations, steps 604 and 606 are performed in the order of step 606 first and step 604 second.

At step 608, the cache controller 402 actually allocates entries for missed cache lines based on the bank priorities. The cache controller 402 uses the priority for any particular cache line unless there are no available slots 303 in the selected bank 305. In the case that there are no available slots 303 in the selected bank 305, the cache controller 402 allocates an entry 303 in a different bank 305. If there are no available slots 303 in any bank 305, then allocation waits until a slot 303 becomes available, allocating in the available slot 303 when that slot becomes available.

In the case that the request 508 is associated with more cache lines than steps 604, 606, and 608 can be performed for in a single allocation iteration, steps 604, 606, and 608 are repeated for each such allocation iteration. In an example, a request 508 is associated with 8 cache lines, but due to hardware limitations, steps 604, 606, and 608 can only be performed on two cache lines for each iteration. Thus the cache controller 402 performs these additional iterations for cache lines 3-8 after performing the first iteration.

As stated above, the fixed and dynamic priority determination techniques are used to determine priorities for the first allocation iteration, while the second and subsequent iterations use an alternating technique. More specifically, for second and subsequent allocation iterations, for each cache line of that iteration, the cache controller 402 selects a bank 305 that is opposite from the bank 305 actually allocated for that cache line in the previous iteration. Note, the chose bank 305 is opposite of the bank 305 actually allocated, as opposed to the priority bank 305, for the cache line of the corresponding position. In an example, in the first iteration, two cache lines are actually allocated entries 303 in banks 305 as follows: a first cache line is allocated to bank 1 and a second cache line is allocated to bank 2. In the subsequent iteration, where two lines are again being allocated, the priorities are chosen as follows: for the first cache line, bank 2 is allocated, and for the second cache line, bank 1 is allocated. In the case that only one allocation occurs in a particular iteration, the priority or that cache line is selected as the opposite of the last priority bank assigned to a cache line. For example, if cache line 2 of the previous iteration is assigned bank 2, then the cache line of the current iteration is assigned bank 1. Note that again, even though the specific banks 305 are chosen as priority for cache lines in the second and subsequent allocation iterations, it is possible for the cache controller 402 to override these selections, for example, if no available slots 303 exist in a prioritized bank 305, then the cache controller 402 selects a different bank 305 with available slots 303 if such a bank 305 exists.

The cache controller 402 requests that cache lines are written into the cache memory 404 at the allocated slots 303 at step 610. Step 610 is repeated as many times as necessary to store all cache lines for a request 508 into the cache memory 404. At step 612, the cache controller 402 causes the cache lines for the request 508 to be read out to provide the requested data to the requestor. The cache controller 402 has a limit to the number of cache lines that can be read out together in a read-out iteration. This limit is based on the hardware configuration and on whether cache lines are in the same bank 305 or a different bank 305. Thus in each read-out iteration, the cache controller 402 reads out cache lines from different banks 305 to the extent possible. If the cache lines are evenly distributed amongst the banks 305, then each iteration is able to read out the maximum number of cache lines. If the cache lines are distributed unevenly amongst the banks 305, then some read-out iterations involve reading out less than the maximum number of cache lines.

Each of the units illustrated in the figures represents one or more of hardware configured to perform the described operations, software executable on a processor, wherein the software is configured to perform the described operations, or a combination of software and hardware.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing cache operations, the method comprising:
    determining a set of cache lines that include data for a vector memory access request;
    determining bank allocation priorities for the set of cache lines, wherein the bank allocation priorities are chosen to result in the set of cache lines being evenly distributed among the banks;
    determining actual banks for the set of cache lines; and
    accessing the cache lines in one or more access iterations, wherein at least one of the one or more access iterations includes accessing multiple cache lines in different banks at the same time.

2. The method of claim 1, wherein determining the set of cache lines that include data for the vector memory access request comprises:
    determining one or more cache line-sized divisions of a memory address space into which memory addresses specified by the vector memory access request fall; and
    identifying the cache lines associated with the cache line-sized divisions.

3. The method of claim 1, wherein determining bank allocation priorities comprises:
    determining bank allocation priorities based on at least a portion of the addresses of the cache lines.

4. The method of claim 1, wherein determining bank allocation priorities comprises:
    determining bank allocation priorities based on a number of available entries in cache sets into which the set of cache lines are to be stored.

5. The method of claim 1, wherein determining bank allocation priorities comprises:
    for second and subsequent iterations, determining banks in an alternating manner with respect to actual banks allocated for previous iterations.

6. The method of claim 1, wherein determining the actual banks for the set of cache lines comprises:
    for a cache line for which an available slot exists in a determined priority bank, selecting, as the actual bank, the determined priority bank.

7. The method of claim 1, wherein determining the actual banks for the set of cache lines comprises:
    for a cache line for which an available slot does not exist in a determined priority bank, selecting, as the actual bank, a bank for which an available slot exists.

8. The method of claim 1, further comprising:
    fetching cache lines of the set of cache lines for which misses occur in the cache.

9. The method of claim 8, further comprising:
    storing the fetched cache lines into the determined actual banks.

10. A cache comprising:
    a cache memory; and
    a cache controller configured to:
        determine a set of cache lines of the cache memory that include data for a vector memory access request;
        determine bank allocation priorities for the set of cache lines, wherein the bank allocation priorities are chosen to result in the set of cache lines being evenly distributed among the banks;
        determine actual banks for the set of cache lines; and
        access the cache lines in one or more access iterations, wherein at least one of the one or more access iterations includes accessing multiple cache lines in different banks at the same time.

11. The cache of claim 10, wherein determining the set of cache lines that include data for the vector memory access request comprises:
    determining one or more cache line-sized divisions of a memory address space into which memory addresses specified by the vector memory access request fall; and
    identifying the cache lines associated with the cache line-sized divisions.

12. The cache of claim 10, wherein determining bank allocation priorities comprises:
    determining bank allocation priorities based on at least a portion of the addresses of the cache lines.

13. The cache of claim 10, wherein determining bank allocation priorities comprises:

determining bank allocation priorities based on a number of available entries in cache sets into which the set of cache lines are to be stored.

14. The cache of claim 10, wherein determining bank allocation priorities comprises:
for second and subsequent iterations, determining banks in an alternating manner with respect to actual banks allocated for previous iterations.

15. The cache of claim 10, wherein determining the actual banks for the set of cache lines comprises:
for a cache line for which an available slot exists in a determined priority bank, selecting, as the actual bank, the determined priority bank.

16. The cache of claim 10, wherein determining the actual banks for the set of cache lines comprises:
for a cache line for which an available slot does not exist in a determined priority bank, selecting, as the actual bank, a bank for which an available slot exists.

17. The cache of claim 10, wherein the cache controller is further configured to:
fetch cache lines of the set of cache lines for which misses occur in the cache.

18. The cache of claim 17, wherein the cache controller is further configured to:
store the fetched cache lines into the determined actual banks.

19. A device, comprising:
a processor; and
a cache, comprising:
a cache memory; and
a cache controller configured to:
determine a set of cache lines of the cache memory that include data for a vector memory access request received from the processor;
determine bank allocation priorities for the set of cache lines, wherein the bank allocation priorities are chosen to result in the set of cache lines being evenly distributed among the banks;
determine actual banks for the set of cache lines; and
access the cache lines in one or more access iterations, wherein at least one of the one or more access iterations includes accessing multiple cache lines in different banks at the same time.

20. The device of claim 19, wherein determining the set of cache lines that include data for the vector memory access request comprises:
determining one or more cache line-sized divisions of a memory address space into which memory addresses specified by the vector memory access request fall; and
identifying the cache lines associated with the cache line-sized divisions.

* * * * *